Oct. 18, 1960     T. TINKER     2,956,821
FLANGED PIPE COUPLING FOR PRESSURE VESSELS
HAVING STRESS COMPENSATING MEANS
Filed Oct. 8, 1956

INVENTOR.
*Townsend Tinker,*
BY
*Bean, Brooks, Buckley + Bean.*
ATTORNEYS.

2,956,821

FLANGED PIPE COUPLING FOR PRESSURE VESSELS HAVING STRESS COMPENSATING MEANS

Townsend Tinker, Orchard Park, N.Y., assignor to American Radiator & Standard Sanitary Corporation, New York, N.Y., a corporation of Delaware Filed Oct. 8, 1956, Ser. No. 614,628

3 Claims. (Cl. 285—114)

This invention relates to a novel ring flange construction for cylindrical vessels, particularly such vessels as are intended to be subjected to substantial internal pressures.

It is a common fabricating expedient, in the construction of large cylindrical vessels, to weld an annular flange to one or both ends of the cylindrical vessel, generally for attachment to a head or cover, to the flanges of an abutting cylinder, or to other associated apparatus or parts.

A substantial problem is presented in the case of such flanges when rigidly attached in the usual manner to the cylindrical vessel wall where the inner radial wall of the flange meets the external periphery of the cylindrical vessel wall. This is because when such a flanged vessel is subjected to pressure loads, the flanges are acted upon by twisting forces which cause them to deflect and seriously distort the vessel wall in the region inward of the inner radial flange wall attachment.

In may prior Patent No. 2,274,439, granted February 24, 1942, the problems created by this complex stressing of the vessel wall be the flange joint are explained to some extent and a proposed solution is described and claimed. However, the structure of my aforesaid prior patent results in a harmful stress concentration at the welded joint between the flange and the cylindrical body. This harmful stress concentration at the inner region of the joint between the flange and the vessel wall results from the abrupt increase in effective cross section when proceeding from the vessel wall to the ring flange and this stress concentration is most severe in the sharp internal corner at the connection between the cylinder and the flange.

The present invention provides a flange construction wherein the effective cross section which bears the flexural stresses described above increases gradually and progressively from a minimum (the thickness of the cylinder wall) to a maximum (approximately the radial width of the flange), so that stresses are not excessively concentrated at the weld joint or at any other zone or area. Furthermore, the novel flange construction and arrangement of the present invention is such that the desired uniform stress graduation is attained by means which permit the bolts to be located as close in toward the cylinder wall as is possible, without interference from welded connections between the flange and the cylinder. The only limiting factor in this regard is the necessary clearance between the bolt head itself and the outer peripheral surface of the cylinder.

Other objects and advantages of the present invention will appear to those skilled in the art to which the invention pertains from a consideration of the following detailed specification and the accompanying drawing which describe and illustrate a preferred embodiment of the invention. It is to be understood, however, that the invention is not limited to the precise form thus shown and described by way of example, nor otherwise than as defined in the appended claims.

Figure 1:
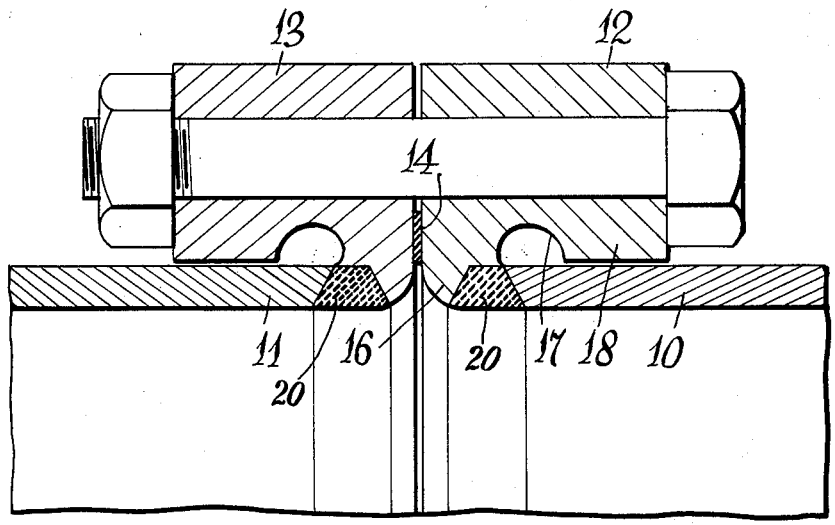
Fig. 1 is a cross sectional view through a pressure vessel joint embodying one form of the connecting flange arrangement of the present invention.

Referring to Fig. 1 of the drawing, the numerals 10 and 11 designate companion meeting end portions of cylindrical bodies which are bolt connected by way of flanges 12 and 13, there being an intervening gasket or pressure seal member 14. The flanges 12 and 13 are alike and a description of flange 12 and its connection with cylinder 10 will suffice for both.

Flange 12 comprises an annular ring member which is generally of rectangular cross section but which has an irregular internal periphery including a medial rounded groove 17, and an internal peripheral portion 18 at its inner end adapted to fit over the end of cylinder 10 and may also include an internal rib 16 at its outer end as in Fig. 1. The outer corner of rib 16 is rounded as shown and the adjacent end of cylinder 10 is preferably beveled to cooperate with an inner beveled face of rib 16 to provide a channel for receiving a weld deposit 20.

Figure 2:
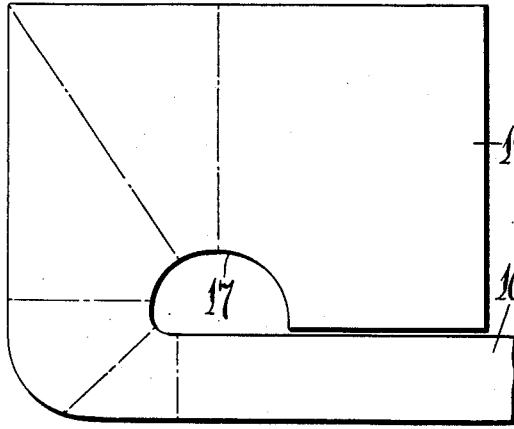
Fig. 2 is a diagrammatic view showing the cross sectional proportions of an assembled flange and cylinder of the structure of Fig. 1.

The foregoing forms a unitary cylinder and end flange formation which is shown schematically in Fig. 2. As indicated by the series of broken lines, the structure forms a curved beam whose effective cross sectional depth increases gradually and progressively, its minimum depth at one end being the thickness of the cylinder wall and its maximum depth at the other end being the distance from the bottom of groove 17 to the outer periphery of the flange 12.

Thus a cylinder and flange connection is provided which eliminates sharp corners and abrupt sectional area changes, particularly at the internal juncture of the connection between the cylinder and the flange where stresses would otherwise tend to be concentrated. This avoids the tendency to develop fatigue failure and cracking at the point where the cylinder wall connects to the flange section. The new flange with its internal groove and outwardly rounded internal rib or face contour, and the method of welding the flange to the cylinder body, produces a smooth transition of areas and prevents high local stress concentrations.

Furthermore, the foregoing cylinder flange construction reduces the amount of welding ordinarily required for connecting the flange to the cylinder by about sixty percent, and yet produces a substantially stronger joint. The arrangement is also such that the bolt holes can be arranged very close to the cylinder body. The type of weld used in ordinary ring flange designs where the inner radial wall of the flange meets the external periphery of the cylinder makes it necessary to move the bolt heads out farther from the cylinder, thus increasing the necessary radial width of the flange. The present construction reduces the necessary bulk of the flange by about thirty-five percent below that which is required for conventional ring flanges with conventional welds.

Figure 3:
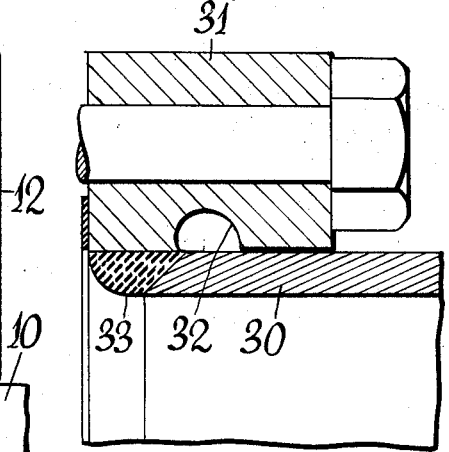
Fig. 3 is a fragmentary view similar to Fig. 1 showing a modified form of the connecting flange arrangement of the present invention.

A modification of the cylinder and flange construction of the present invention is shown in Fig. 3. The arrangement is generally the same as that of the preceding embodiment excepting that the internal rib 16 is omitted. The cylinder body is designated 30, the flange 31 and its internal groove 32. The outer end portion of the inner periphery of flange 31 and the beveled outer end face of cylinder 30 are joined by a weld 33, whereby an integral cross sectional outline of the same characteristics as that illustrated schematically in Fig. 2 is produced.

I claim:
1. Pressure vessel construction including a hollow cylindrical body and an external radial flange fixed to an end thereof, said external flange being of generally rectangular cross section with the longer dimension in the direction of the axis of the cylindrical body and adapted to fit over the end of said cylindrical body, an internal rib at the outer end of said flange having an internal diameter approximately equal to the internal diameter of the cylindrical body and spaced from the adjacent end thereof to form an internal weld-receiving channel, said internal rib having a rounded edge at the outer end of its internal periphery, and an internal rounded groove in the inner periphery of said flange medially thereof and immediately inwardly of said weld channel in an axial direction said rectangular flange having bolt-receiving openings extending lengthwise therethrough.

2. Pressure vessel construction including a hollow cylindrical body and an external radial flange fixed to an end thereof, said external flange being of generally rectangular cross section with the longer dimension in the direction of the axis of the cylindrical body and adapted to fit over the end of said cylindrical body, an internal rib at the outer end of said flange having an internal diameter approximately equal to the internal diameter of the cylindrical body and spaced from the adjacent end thereof to form an internal weld-receiving channel, said internal rib having a rounded edge at the outer end of its internal periphery, and an internal rounded groove in the inner periphery of said flange medially thereof and immediately inwardly of said weld channel in an axial direction, said rounded edge rib and said rounded groove cooperating to provide cylinder wall and flange construction comprising a curved beam of gradually increasing cross sectional area from the cylinder wall to the full thickness of the flange beyond said groove said rectangular flange having bolt-receiving openings extending lengthwise therethrough.

3. Pressure vessel construction including a hollow cylindrical body and an external radial flange fixed to a end thereof, said external flange being of generally rectangular cross section with the longer dimension in the direction of the axis of the cylindrical body and adapted to fit over the end of said cylindrical body, an internal rib at the outer end of said flange having an internal diameter approximately equal to the internal diameter of the cylindrical body and spaced from the adjacent end thereof to form an internal weld-receiving channel, said internal rib having a rounded edge at the outer end of its internal periphery whereby the inner periphery of the cylindrical body and the outer radial face of the flange are joined to form an unbroken continuous surface, and an internal rounded groove in the inner periphery of said flange medially thereof and immediately inwardly of said weld channel in an axial direction said rectangular flange having bolt-receiving openings extending lengthwise therethrough.

References Cited in the file of this patent

UNITED STATES PATENTS

| | | |
|---|---|---|
| 1,215,967 | Murray | Feb. 13, 1917 |
| 1,936,420 | Bailey | Nov. 21, 1933 |
| 2,274,439 | Tinker | Feb. 24, 1942 |
| 2,313,208 | Allen | Mar. 9, 1943 |
| 2,446,481 | Letterman | Aug. 3, 1948 |

FOREIGN PATENTS

| | | |
|---|---|---|
| 383,913 | Great Britain | Nov. 24, 1932 |
| 554,605 | Germany | June 23, 1932 |
| 870,347 | Germany | Mar. 12, 1953 |